United States Patent Office 3,301,053
Patented Jan. 31, 1967

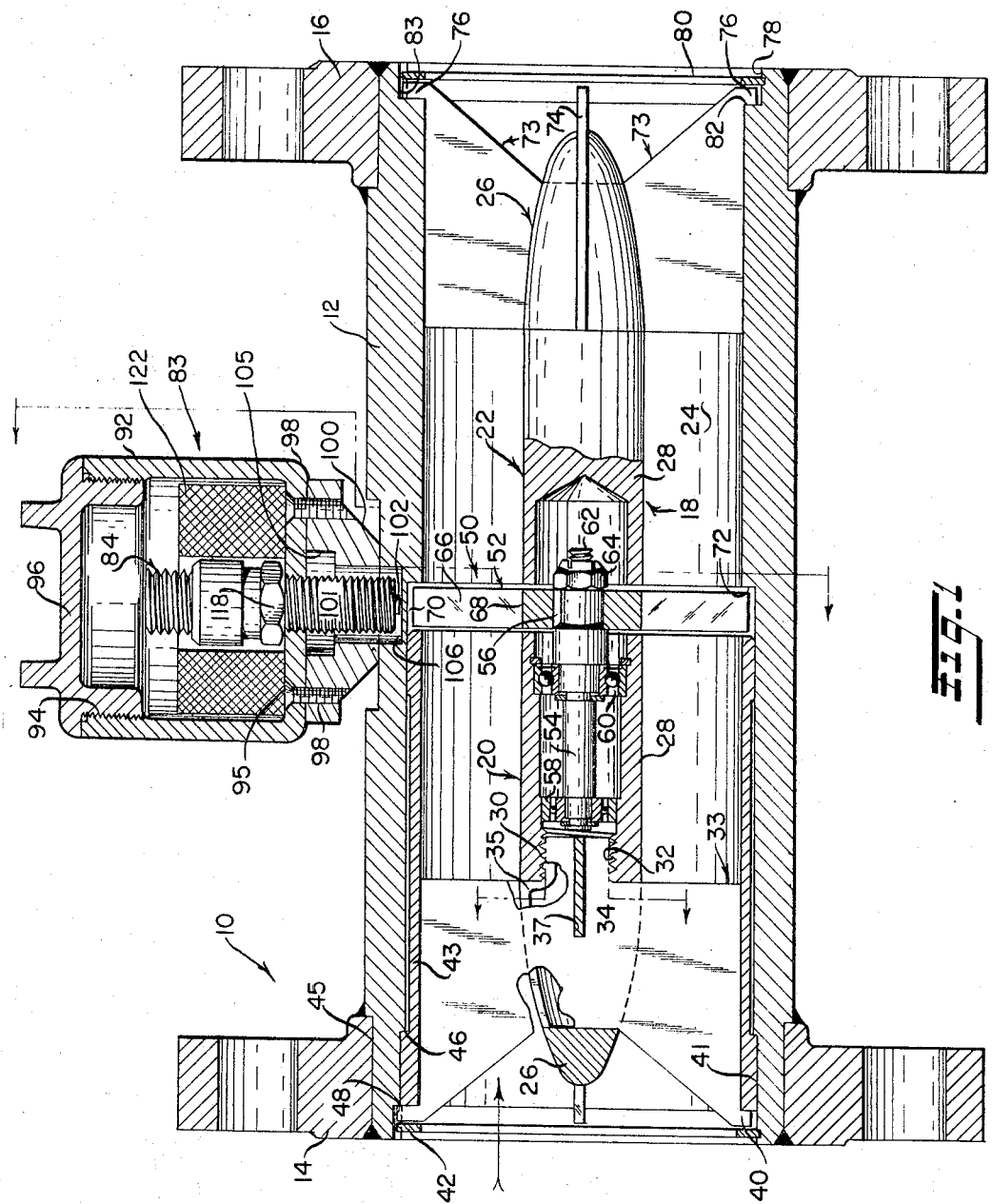

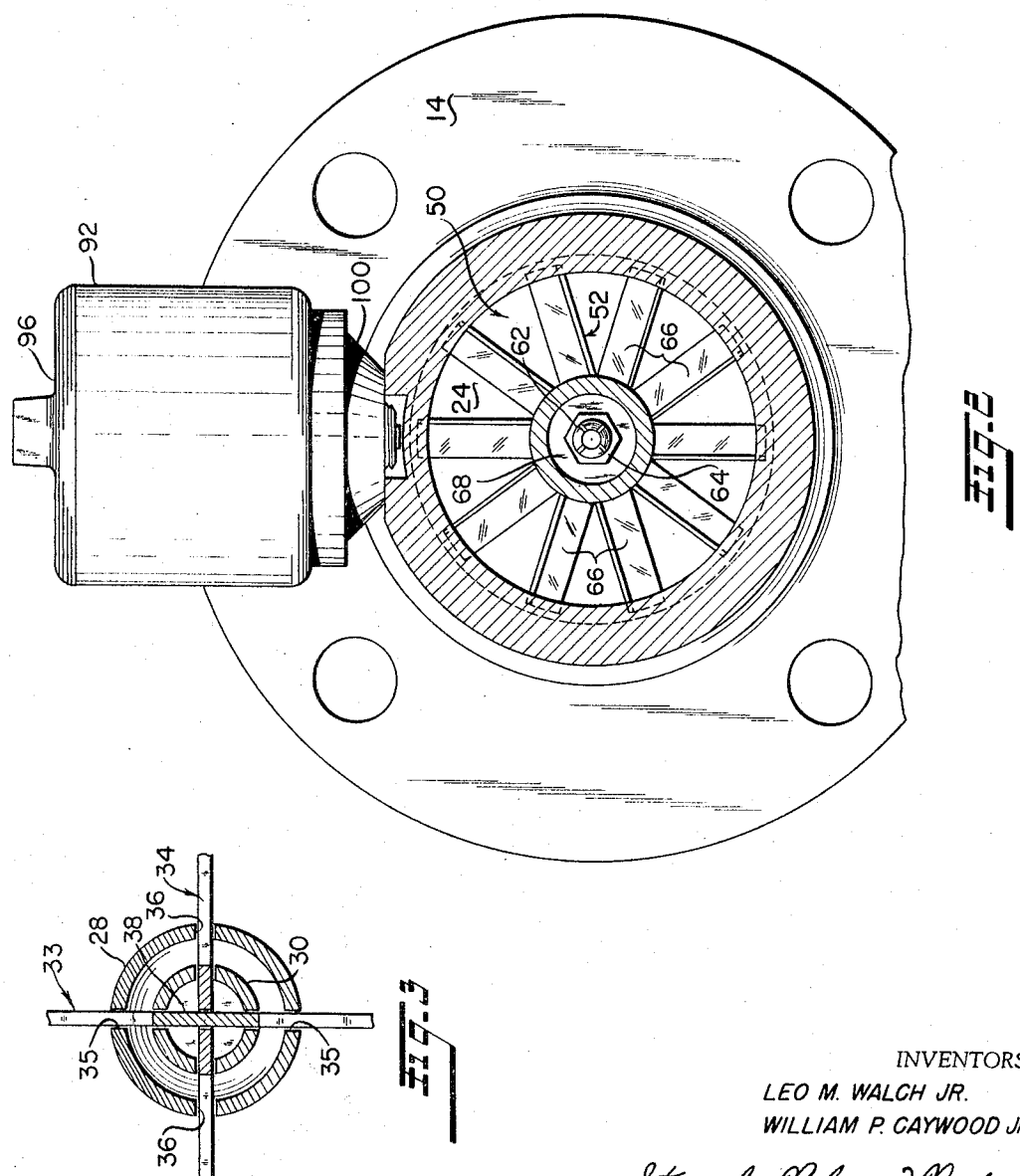

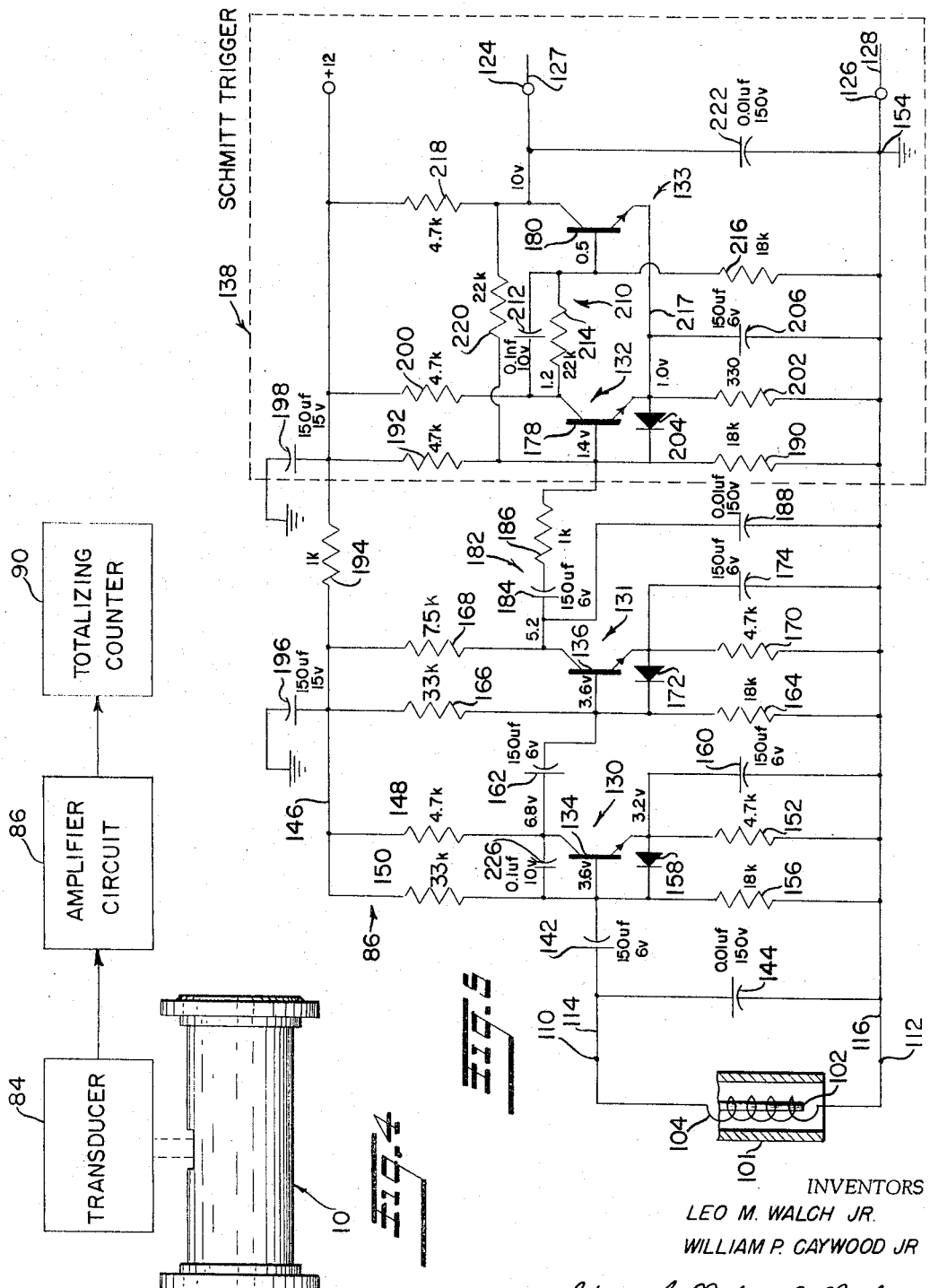

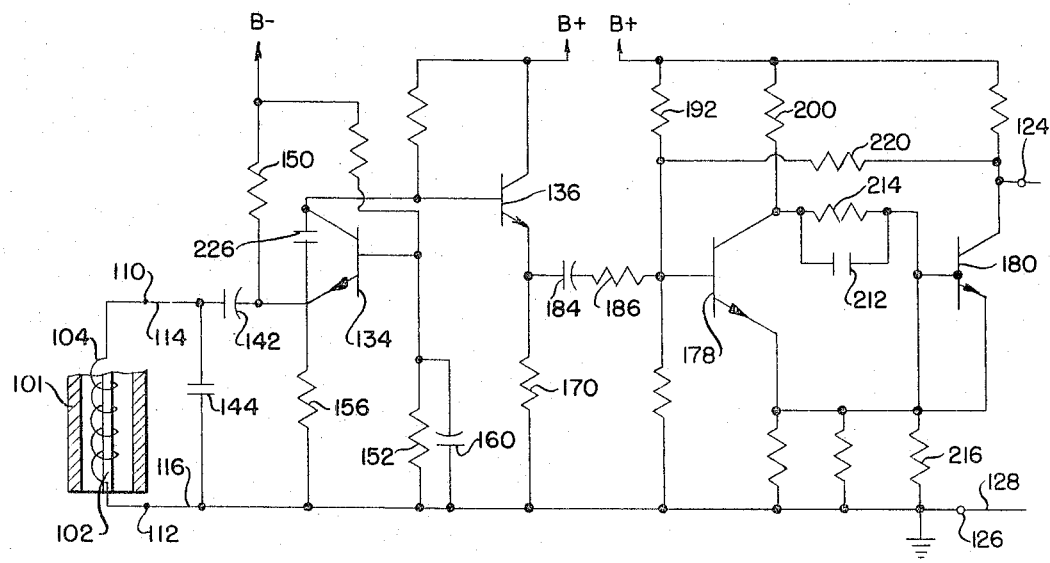

3,301,053
FLOW METER
Leo M. Walch, Jr., Pittsburgh, and William P. Caywood, Jr., Murrysville, Pa., assignors to Rockwell Manufacturing Company, Pittsburgh, Pa., a corporation of Pennsylvania
Filed Feb. 28, 1964, Ser. No. 348,153
8 Claims. (Cl. 73—231)

The present invention relates to flow meters and more particularly to an apparatus and circuit for producing an electrical signal which is representative of fluid flow rate.

This invention is especially useful for indicating the total volume or rate of volume flow passing through a turbine-type flow meter.

In the recent past it has become the practice to detect rotation of a fluid metering rotor with an electrical signal generating pick-up unit or transducer and to apply the electrical signal produced by the pick-up unit to an electrically actuated totalizing counter. Although this arrangement provides for generally satisfactory service, certain difficulties resulting in inaccurate registration have been encountered.

One difficulty is in setting the sensitivity level of the counter to assure detection of the pick-up unit signal over a wide range of fluid flow rates without sensing stray noise voltages which tend to produce false counts. As a result, the sensitivity settings of counters in fluid flow measurement systems prior to this invention are required to be a compromise between a maximum sensitivity level to detect the widest possible range of fluid flow rates and a minimum sensitivity level to reject extraneous noise voltages for assuring accurate registration of the volumetric flow rate.

Another related difficulty in prior art flow meters employing electrical signal generating pick-up units is the problem of separating signal from noise voltages when the signal transmission line between the transducer at the meter and the counter at some remote location is long and/or when there is a high level of electrical noise in the vicinity of the meter or the transmission line. Under these conditions noise voltages may be larger than the signal voltages, especially at low flow rates.

The present invention overcomes these difficulties by providing a novel amplifier and Schmitt trigger circuit wherein an amplifier feedback is employed to produce a constant amplitude output above a predetermined frequency. This constant amplitude signal is applied to the input of the Schmitt trigger, and the entire amplifying and squaring circuit is contained in a novel pick-up unit mounted on the flow meter housing. As a result of generating a constant amplitude, a non-critical sensitivity level over the entire range of the output signal can be selected. Also, false counts due to noise are minimized as a consequence of amplifying the transducer signal at its source.

With conventional transducers, an output signal is generated whose frequency and amplitude are directly proportional to the angular velocity of the metering rotor. In applying this type of signal to an amplifier-Schmitt trigger network without the feedback of this invention, it was found that the amplitude of the amplifier output at higher frequencies caused shifts in the voltage bias on the trigger with the result that the trigger produced an objectionable wave form, or did not fire at all. It was discovered that the constant amplitude resulting from the employment of the feedback in the circuit of this invention lessens the bias shift on the Schmitt trigger to thereby assure a more dependable trigger operation.

It is, therefore, the major object of this invention to provide a novel fluid meter apparatus which measures fluid flow with improved accuracy.

Another object of the invention is to provide an economical, compact assembly capable of being mounted on the meter body, which delivers the necessary signal shape and strength to accurately operate a remote counter.

A more specific object of this invention is to provide a novel fluid meter pick-up unit wherein an electrical signal is generated in response to fluid flow and is amplified at the meter.

Another object of this invention is to provide a novel fluid meter pick-up unit which lessens the objectionable detection of stray noise voltages to thereby minimize false counts.

A further and more specific object of this invention is to provide a novel fluid meter pick-up unit comprising a transducer, an A.-C. amplifier, and a Schmitt trigger coupled in series relationship wherein the amplifier incorporates a feedback to produce an output voltage having a constant amplitude above a predetermined frequency to lessen the shift of the voltage bias on the Schmitt trigger coupling network.

Still another object of this invention is to provide a novel fluid meter pick-up unit having a transducer whose sensitivity is easily adjustable.

Further objects of this invention will presently appear as the description proceeds in connection with the appended claims and the annexed drawings wherein:

FIGURE 1 is a longitudinal section of an axial flow turbine meter assembly constructed according to a preferred embodiment of the present invention;

FIGURE 2 is a section taken substantially along lines 2—2 of FIGURE 1;

FIGURE 3 is a section taken substantially along lines 3—3 of FIGURE 1;

FIGURE 4 is a diagrammatic illustration of the flow meter shown in FIGURE 1 and incorporating the circuitry for the pick-up unit of this invention;

FIGURE 5 is a circuit diagram of the pick-up unit illustrated in FIGURES 1 and 4, showing the preferred electrical circuit of this invention; and FIGURE 6 is a circuit diagram of an alternate embodiment, showing the feedback capacitor coupled between the collector and the emitter in a common base amplifier circuit.

Referring now to the drawings and more particularly to FIGURES 1–3, the reference numeral 10 generally designates an axial flow turbine meter comprising a metal, generally tubular housing 12 to which pipe attachment flanges 14 and 16 are fixed at opposite ends. Coaxially mounted in housing 12 is a fluid guide structure 18 comprising axially aligned, spaced apart faired core assembly 20 and 22 which cooperate with housing 12 to form an annular fluid flow passage 24 extending between the inlet end and the outlet end of the meter. Although fluid to be metered may flow in either direction through housing 12, it will be assumed, for purposes of describing the meter construction illustrated herein, that the flow is to the right so that core assembly 20 is upstream from core assembly 22.

With continued reference to FIGURE 1, core 20 is generally of hollowed out configuration and comprises a nose cap 26 and a generally tubular section 28. Nose cap 26 has a gradually diverging cross-section for guiding fluid to be metered through the inlet end of housing 12 and smoothly merges with tubular section 28 which has a uniform external diameter. At its inner end cap 26, as shown, is provided with a coaxial threaded boss 30 that is securely received in a tapped bore 32 coaxially formed in the upstream end of tubular section 28 to support section 28 in cantilever fashion in the manner shown.

As shown in FIGURES 1 and 3, core assembly 20 is supported in housing 12 by a pair of mutually perpendicular radially extending vane plates 33 and 34 which are respectively received with a snug fit in straight-sided slots 35 and 36 formed in nose cap 26 and extending axially from the inner end of boss 30. Plates 33 and 34 are relatively thin, flat-sided members and are formed with opposed, interengaging axially extending slots 37 (FIGURE 1) and 38 (FIGURE 3) so as to be non-rotatably secured together in internested relationship. In assembled relationship, plates 33 and 34 are axially clamped in place between the bottom edges of slots 35 and 36 and upstream end face of section 28.

With continued reference to FIGURE 1, the plates 33 and 34 extending radially across passage 24 terminate in small radial tabs 40 which slidably fit into a stepped, counterbored recess 41 formed in housing 12 radially inwardly of flange 14. Tabs 40 are axially clamped between a groove-seated snap ring 42 and a sleeve 43. Sleeve 43 is slidably, coaxially received in housing 12 and is provided at its outer end with a diametrically enlarged section 45 which snugly abuts an annular shoulder 45 formed in housing 12 at the inner end of recess 41. At least one of the tabs 40 extends into an inwardly open slot 48 formed in housing 12 to prevent assembly 20 and plates 33 and 34 from rotating. With this construction, it is clear that core assembly 20 is fixed in place in housing 12 and is axially removable from the housing by removing snap ring 42.

With continued reference to FIGURES 1 and 2, a metering rotor assembly 50 comprising a peripherally bladed rotor 52 is non-rotatably fixed to a short journal shaft 54 as by a key 56. Shaft 54 is coaxially, rotatably supported in section 28 by axially spaced apart anti-friction ball bearing assemblies 58 and 60. Shaft 56 extends coaxially through rotor 52 and terminates in a threaded section 62 which receives a nut 64 that axially retains rotor 52 in place.

As shown in FIGURES 1 and 2, rotor 52 is provided with a plurality of equiangularly spaced apart straight blades 66 which are fixed to and extend radially from a rotor hub 68 at a predetermined angle to the longitudinal axis of the meter. Blades 66 are relatively long and extend completely across passage 24 into an annular, uninterrupted, inwardly open recess 70. The opposed side walls of recess 70 are formed by the inner end of sleeve 43 and an annular shoulder 72 in housing 12 and are contained in parallel planes extending at right angles to the rotational axis of rotor 52. With this construction it is clear that recess 70 circumferentially surrounds rotor 52.

The construction of core assembly 22 is preferably the same as that of core assembly 20, with like reference numerals being used to identify like parts. Similar to the support structure for core assembly 20, assembly 22 is supported in housing 12 by mutually perpendicular thin, flat-sided vane plates 73 and 74. Plates 73 and 74 are of the same construction as plates 33 and 34 and terminate in tabs 76.

As shown in FIGURE 1, tabs 76 slidably fit into a counterbored recess 78 formed in housing 12 and are axially clamped between a groove-seated snap ring 80 and an annular shoulder 82 formed in housing 12 at the inner end of recess 78. At least one of the tabs 76 is snugly received in an inwardly open housing slot 83 to prevent core assembly 22 and plates 73 and 74 from rotating. The mounting of plates 73 and 74 in core assembly 22 is preferably the same as that described for plates 33 and 34.

As shown, rotor 52 is disposed axially between core assemblies 20 and 22. All of the parts of meter 10 thus far described are preferably made of non-magnetic material except for blades 66 which are magnetic and preferably made of stainless steel for a purpose to be presently described.

With reference to FIGURES 1 and 4, rotation of rotor 52 is detected by a pick-up unit 83 comprising an inductor type signal transducer 84 having an output electrically connected to the input of an amplifier circuit 86. The output of circuit 86 is electrically connected to the input of a conventional electrically actuated totalizing counter 90 of any suitable type.

As shown in FIGURE 1, pick-up unit 83 is exteriorly mounted on housing 12 and comprises an essentially cup-shaped non-magnetic housing 92 having an open top 94 and flat bottom wall 95. A cover 96 threadedly secured to housing 92 extends over the open top thereof. Housing 92 is fixed by screws 98 to a mounting plate 100 which is secured to housing 12 by any suitable means (not shown). Transducer 84 is basically of conventional construction and comprises a magnetic cylindrical holding member 101 which coaxially received and supports a center permanently magnetized core 102 along a longitudinal axis that radially aligns with blades 66 of rotor 52. Core 102 is of one polarity and shell 101 is of opposite polarity so that flux lines will flow between these two parts in the usual manner. An inductor coil 104 (FIGURE 5) is wound around core 102. This transducer construction is conventional and is generally shown in United States Letters Patent No. 2,396,703 issued March 19, 1946.

Member 101 threadedly extends through a tapped bore in wall 95 and projects into a recess 105 formed in mounting plate 100. The inner ned of magent 102 extends beyond shell 101 and into an outwardly opening recess 106 formed in housing 12 radially opposite from recess 70.

As shown in FIGURE 5, coil 104 is provided with terminals 110 and 112 to which a pair of conductors 114 and 116 of circuit 86 are respectively connected. With this arrangement, the tips of blades 66, which are magnetic, vary the flux density between core 102 and member 101 when rotation is imparted to rotor 52 by flow of fluid in either direction through passage 24. In response to these flux density variations, an electrical voltage is induced in coil 104. As a result, the transducer output at terminals 110 and 112 will be a sinusoidal wave whose frequency and amplitude are directly proportional to the angular speed of rotor 52.

In accordance with the present invention, the radial air gap between the inner end of core 102 and the opposed recess surface of housing 12 is adjustable by threading member 101 inwardly or outwardly. This adjustment affects the sensitivity of transducer 84 in that it varies the amplitude of the output voltage. A lock unt 118 threaded onto member 101 within housing 92 may be tightened against wall 95 to non-rotatably fix member 101 and core 102 in a selected longitudinally adjusted position.

Circuit 86 is potted in a molded, annular shaped solid form or module 122 which is preferably made of cured epoxy. Form 122 is mounted in housing 92 and is seated on bottom wall 95 in surrounding relationship to the upper portion of member 101 projecting into the interior of housing 92. In making form 122, the branches of circuit 86 are soldered together and the assembled network is then placed in a suitable mold. The mold is then filled sufficiently with epoxy which is cured in the mold by any suitable method. After the epoxy is cured, the mold is removed and form 122 with circuit 86 embedded therein is placed in housing 92 and electrically connected to coil 104. Circuit 86 has a pair of output terminals 124 and 126 (FIGURE 5) in housing 92 which are connected by suitable conductors 127 and 128 to counter 90. Counter 90 may either be disposed adjacent to meter 10 or at some remote location.

With reference now to FIGURE 5, amplifier circuit 86 comprises four cascaded stages 130, 131, 132, and 133. The first two stages 130 and 131 are A.-C. coupled amplifier respectively having transistors 134 and 136. The third and fourth stages 132 and 133 comprise a Schmitt trigger or squaring circuit indicated generally at 138.

With continued reference to FIGURE 5, which discloses the preferred embodiment of the present invention conductor 114 contains a capacitor 142 connected to the base of transistor 134, thus providing a capacitance coupling between the input to transistor 134 and the output terminal 110 of transducer 84. A capacitor 144 having its terminals respectively connected to conductor 116 and to conductor 114 between terminal 110 and capacitor 142 is shunted across coil 104 to suppress high frequency noise. The collector of transistor 134 is connected to a conductor 146 through a collector resistor 148. Conductor 146 is connected at one end to the positive side of a D.-C. current bias source and at its other end to conductor 114 between capacitor 142 and transistor 134. The portion of conductor 146 extending between the terminal to resistor 148 and conductor 114 contains a resistor 150 which is in parallel with resistor 148 and capacitor 226.

With continuing reference to FIGURE 5, the emitter of transistor 134 is connected through a resistor 152 to conductor 116 which is in turn connected at 154 to ground or a reference potential. A resistor 156 having one terminal connected to conductor 116 and its other terminal connected to conductor 114 between capacitor 142 and transistor 134 is in parallel with resistor 152 and diode 158.

To protect transistor 134 from excessive base to emitter reverse voltage a diode 158 is connected from the base to the emitter of the transistor. Connected between the emitter of transistor 134 and conductor 116 in parallel with resistor 152 is an emitter by-pass capacitor 160 which passes only the A.-C. signal component. With this circuitry it is clear that capacitor 142 isolates transducer 84 from the D.-C. voltage source.

With continued reference to FIGURE 5, the collector of transistor 134 is connected to the base of transistor 136 by a coupling network comprising a capacitor 162. A resistance branch comprising a resistor 164 has its terminals respectively connected to conductor 116 and to the capacitor coupling between capacitor 162 and the base of transistor 136. This capacitor coupling comprising capacitor 162, it will be appreciated, transfers the A.-C. component of the collector output voltage of the first stage amplifier 130 to the input of the second amplifier stage 131. A resistor 166 in series with resistor 164 is connected to conductor 146.

With continued reference to FIGURE 5, the collector of transistor 136 is connected to conductor 146 through a resistor 168. With this circuitry, it is clear that the voltage bias from the D.-C. current source is applied to the collectors of transistors 134 and 136 through resistors 148 and 168 respectively.

As shown in FIGURE 5, the emitter of transistor 136 is connected to conductor 116 through a resistor 170. A diode 172 connected from the base to the emitter of transistor 136 protects the transistor from excessive base to emitter reverse voltage. Connected between the emitter of transistor 136 and conductor 116 in parallel circuit relation with resistor 170 is an emitter by-pass capacitor 174.

With continued reference to FIGURE 5, the third and fourth stages 132 and 133 forming the Schmitt trigger respectively comprise transistors 178 and 180. The output of transistor 136 forming the second amplifier stage 131 is connected by a coupling network 182 to transistor 178. Coupling network 182 comprises a capacitor 184 in series with a resistor 186 and is connected between the collector of transistor 136 and the base of transistor 178. A capacitor 188 having one of its terminals connected to the collector of transistor 136 and the other of its terminals connected to condutcor 116 is effective to suppress high frequency noise. As shown, capacitor 184, resistor 186 and a resistor 190 are connected in series across the output of the second amplifier stage 131. Resistor 190 is connected across conductors 116 and 146 in series with a further resistor 192. Disposed in conductor 146 between the terminal connection of resistors 168 and 192 is a resistor 194. Conductor 146 is connected to ground or reference potential respectively through capacitors 196 and 198 at spaced points adjacent the terminal connections to resistors 166 and 192.

As shown in FIGURE 5, the collector of transistor 178 is connected to conductor 146 through a collector resistor 200. The emitter of transistor 178 is connected to conductor 116 through a resistor 202. A diode 204 connected from the emitter to the base of transistor 178 protects the transistor from excessive base to emitter reverse voltages. As shown, a by-pass capacior 206 has one of its terminals connected to the emitter of transistor 178 and the other of its terminals connected to conductor 116 in parallel with resistor 202.

With continued reference to FIGURE 5, the output of the third stage 132 is connected to the input of the fourth stage 133 by a coupling network 210. Coupling network 210 comprises a capacitor 212 in parallel with a resistor 214. Capacitor 212 and resistor 214 each have their terminals respectively connected to the collector of transistor 178 and to the base of transistor 180. As shown, a resistor 216 is connected in series with capacitor 212 and resistor 214 across the output of stage 132. The emitter of transistor 180 is connected to the emitter of transistor 178 by a conductor 217. The collector of transistor 180 is connected to conductor 146 through a collector resistor 218.

As shown in FIGURE 5, a resistance branch comprising a resistor 220 is connected between the collector of transistor 180 and the base of transistor 178. Resistor 220 determines the amount of hysteresis from the collector of transistor 180 to the base of transistor 178. Preferably, larger than normal trigger level hysteresis is desired to minimize multiple output pulses due to a marginal trigger level at the input of the Schmitt trigger. Connected from the collector of transistor 180 to conductor 116 is a capacitor 222 for suppressing high frequency noise.

As shown, the output terminals 124 and 126 of amplifier circuit 86 are respectively connected to the collector of transistor 180 and to conductor 116.

Each of the circuits thus far described for the A.-C. coupled amplifier stages 130 and 131 and for trigger 138 is conventional and well known. Circuit values constituting one embodiment of the invention are illustrated in FIGURE 5. With this circuitry, it is clear that as the transducer output signal increases as a result of increasing the rotational speed of rotor 52, the first amplifier stage 130 is eventually driven to clipping so that the signal output essentially resembles a truncated sine wave. This clipped wave is applied to the second amplifier stage 131 whose output is also a clipped sine wave which fires trigger 138. The output signal of trigger 138, as is well known, is a square wave having a constant amplitude, and this signal is transmitted to actuate counter 90. The operation of trigger 138 also is well known and is described in detail in various texts such as, for example, Pulse and Digital Circuits (pp. 164–172) by Jacob Millman and Herbert Taub, published in 1956 by McGraw-Hill Book Company.

With the above described circuit, it will be appreciated that the amplitude of the output signal at stage 131 will determine if trigger 138 will fire and thus operate normally to produce an output signal accurately reflecting the number of turns made by rotor 52. It has been found with the circuitry thus far described that the output voltage amplitude at the collector of stage 131 is objectionally influenced by voltage bias shifts or, more particularly, shifts in the D.-C. levels on the coupling capacitors. If the amplitude of the collector voltage at stage 131 is allowed to increase beyond a certain limit, for example, a shift in the bias on trigger 138 and capacitor 174 may occur with the result that trigger 138 may produce an undesirable waveform or may not fire at all. Such malfunctions, it is evident, result in inaccuracies in registering the number of turns made by rotor 52.

The variations of the amplifier amplitude are found to have an effect on ratio distortion which essentially originates in stage 130. When transistor 134 is "on," capacitor 162 is connected effectively through capacitor 160 to ground, thus providing a low resistance path. When transistor 134 is "off," however, capacitor 162 is connected through resistor 148 to the +12 voltage D.-C. supply level shown in FIGURE 5. This current path through resistor 148 has a greater resistance than the transistor "on" path through capacitor 160, and the difference in resistance between these charging and discharging paths of capacitor 162 essentially gives rise to ratio distortion.

In accordance with the preferred embodiment of this invention, the D.-C. level on coupling capacitors 162 and 184 is rendered more constant by a negative fedback capacitor 226 connected from the collector to the base of transistor 134. Capacitor 226 is effective to alter the gain versus frequency characteristics of amplifier stage 130. This characteristic shows that the gain of stage 130 is contant from 0 to 60 pulses per second for the circuit values illustrated in FIGURE 5. Above 60 pulses per second, the gain of stage 130 decreases in direct proportion as the frequency increases. Owing to this gain versus frequency characteristic and to the nature of sinusoidal output signal of transducer 84, the output of amplifier stage 130 is a sinusoidal voltage having an amplitude which is directly proportional to its frequency up to 60 pulses per second. Above 60 pulses per second the amplitude of the first stage amplifier output then becomes substantially constant despite further increases in frequency. Thus, the amplitude of the first amplifier stage output and, consequently, the second amplifier stage output for a suitable working frequency range of 60 through 2000 pulses per second will be constant and not dependent on the rotational speed of rotor 52.

A similar effect may be obtained by using the embodiment of FIGURE 6 where the feedback capacitor is connected from the emitter to the collector of the transistor.

With the negative feedback capacitor 226, therefore, the clipped wave with constant amplitude above 60 pulses per second and ratio distortion is applied to the input of amplifier stage 131. Because of the constant amplitude, however, the D.-C. distortion level will not vary beyond a tolerable magnitude with the result that there is less bias shift. This reduction in bias shift renders the amplitude on the collector of transistor 136 essentially constant above 60 pulses per second. More dependable operation of trigger 138 is thus assured. With less bias shift, operation of the circuitry advantageously can be confined to a more restricted linear region of the transistor characteristic.

This means that the operating freqeuncy range over which the circuit 86 will transmit pulses to the counter 90 is greatly enlarged. By utilizing the full gain of the amplifier circuit in the lower range, the trigger 138 can be made to fire down to about 7 pulses per second rotational speed. When the rotor 52 goes above 60 pulses per second, the upper limit of registration is no longer dependent on the input signal amplitude and the resultant bias shift to cutoff, as is the case with conventional circuits. Above 60 pulses per second, the amplitude of the signal is maintained at a constant value by feedback capacitor 226, and the upper limit of the frequency range is now limited only by the high frequency "roll-off" characteristics of the circuit.

In the present embodiment, there are preferably ten blades on rotor 52, and the angle between each blade and the longitudinal axis of meter 10 is approximately 35°.

It will be appreciated that the frequency at which the gain begins to decrease in direct proportion as the frequency increases can be varied by such factors as adjusting the clamp between core 102 and housing 12 and by changing the turns of wire used to make up coil 104.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed and desired to be secured by United States Letters Patent is:

1. In a fluid meter, a housing having inlet and outlet openings, a rotor rotatably supported in said housing to be driven by fluid flow therethrough, electrical means responsive to rotation of said rotor to produce an undulating signal at least partially representative of a sinusoidal function whose frequency is proportional to the rotational speed of said rotor and whose amplitude is constant above a predetermined frequency, and means mounting said electrical means exteriorly of said housing, said electrical means comprising:
    (a) a permanent magnet core,
    (b) an inductor coil wound around said core,
    (c) means adjustably mounting said core along a longitudinal axis that radially aligns with said rotor, and
    (d) an A.-C. amplifier having a transistor, means coupling the base and the emitter of said transistor to respective output terminals of said coil, a feedback capacitor coupling from the output to the input of said transistor, and a D.-C. voltage bias source connected to the collector of said transistor, said emitter being connected through its coupling to the output terminal of said coil and to a reference potential.

2. In a fluid meter, a housing having inlet and outlet openings, a rotor rotatably supported in said housing to be driven by fluid flow therethrough, an electrically actuatable register, and pickup means mounted exteriorly on said housing for sensing rotation of said rotor and comprising a casing, an inductor coil supported by said casing and having output terminals, means for inducing voltage variations in said coil in response to rotation of said rotor to produce at said terminals a sinusoidal signal whose amplitude and frequency are proportional to the rotational speed of said rotor, and a potted amplifying and squaring circuit mounted in said casing and having an input connected to the terminals of said coil and an output connected to said electrically actuatable register, said circuit comprising an A.-C. amplifier having a transistor, a Schmitt trigger circuit having an input, a first coupling network connecting the collector of said transistor to the input of said trigger circuit, a second coupling network connecting the emitter and base of said transistor to respective terminals of said coil, and a negative capacitance feedback coupling the collector of said transistor to another element thereof and being effective to render the amplitude of the transistor collector output voltage constant above a predetermined frequency.

3. In a fluid flow meter,
(a) a housing having inlet and outlet openings,
(b) a rotor rotatably supported in said housing to be driven by fluid flow therethrough,
(c) an inductor coil mounted exteriorly of said housing and having output terminals,
(d) means for inducing voltage variations in said coil in response to rotation of said rotor to produce at said terminals a sinusoidal signal whose amplitude and frequency are proportional to the rotational speed of said rotor,
(e) an A.-C. amplifier including a transistor,
(f) means respectively coupling the base and emitter of said transistor to the output terminals of said coil,
(g) means for applying a D.-C. bias to the collector of said transistor,
(h) means coupling the emiter of said transistor to a reference potential,
(i) a capacitance feedback coupling connected from the collector to the base of said transistor and being effective to render the amplitude of the voltage signal on the transistor collector constant above a predetermined frequency,
(j) a Schmitt trigger squaring circuit having at least one transistor,
(k) a coupling network connecting the transistor collector of said amplifier to the base of the transistor in said squaring circuit, and
(l) means connected to said squaring circuit for indicating the signal pulses emitted thereby.

4. In a fluid flow meter,
(a) a housing having fluid inlet and outlet openings,
(b) a rotor rotatably supported in said housing to be driven by fluid flow therethrough,
(c) an electrically actuatable counter for indicating fluid flow rate and having input terminals, and
(d) a pick-up unit for sensing rotation of said rotor and comprising:
  (1) a casing mounted on said housing,
  (2) a transducer mounted in said casing and having a pair of output terminals,
  (3) said transducer being effective in response to rotation of said rotor to generate an electrical sinusoidal signal whose amplitude and frequency are proportional to the angular velocity of said rotor,
  (4) and A.-C. amplifier including a transistor having an input and an output,
  (5) means including a capacitor coupling the input of said transistor to the output terminals of said coil,
  (6) a signal squaring circuit having input terminals and output terminals,
  (7) means including a capacitance coupling connecting the transistor output to the input terminals of said squaring circuit,
  (8) means connecting the output terminals of said squaring circuit to the input terminals of said counter, and
  (9) means providing a capacitance feedback coupling for said transistor, said feedback coupling being effective to alter the gain versus frequency characteristic of said transistor such that the gain is substantially constant up to a predetermined frequency and decreases in direct proportion as the frequency increases above said predetermined frequency.

5. The fluid meter defined in claim 4 wherein said squaring circuit comprises a transistorized Schmitt trigger.

6. The fluid meter defined in claim 5 wherein said amplifier and said Schmitt trigger are potted in a molded form of insulating material, said form being essentially annular in shape and seated in said casing in surrounding relation to said transducer.

7. In a turbine flow meter, a housing having axially aligned fluid inlet and outlet openings, a peripherally bladed turbine metering rotor coaxially and rotatably supported in said housing to be driven by flow of fluid therethrough, an electrically actuatable counter, and a pickup unit comprising a casing exteriorly mounted on said housing, a permanently magnetized core, an inductor coil wound around said core and having output terminals, and a magnetic holding member coaxially receiving and supporting said core along a longitudinal axis that radially aligns with the blades of said rotor in closely radially spaced relation to said housing, said holding member being threadedly mounted in said casing for longitudinal adjustment to selectively vary the radial space between said core and said housing, the rotation of said rotor being effective to vary the flux linking said holding member and said core to produce at the terminals of said coil a sinusoidal signal whose amplitude and frequency are proportional to the rotational speed of said rotor, an A.-C. amplifier having at least two cascaded stages respectively including first and second transistors, a D.-C. voltage bias source connected to the collectors of said transistors, a plurality of capacitance by-pass coupling networks respectively connecting the emitters of said first and second transistors to one terminal of said coil and to a reference potential, a D.-C. isolating capacitance coupling network connecting the base of said first transistor to the other of said coil terminals, a further capacitance coupling network connecting the collector of said first transistor to the base of said second transistor, a negative feedback capacitance coupling connected from the collector to the base of said first transistor for rendering the amplitude of the voltage signal on the collector of said first transistor constant above a predetermined frequency, a Schmitt trigger network having a pair of output terminals connected to said electrically actuatable counter and including a transistor having its collector connected to said source and its emitter to said reference potential, and a further capacitance coupling network connecting the collector of said second transistor to the base of the transistor of said trigger network.

8. In a fluid flow meter, a housing having fluid inlet and outlet openings, a rotor rotatably supported in said housing to be driven by fluid flow therethrough, an inductor coil having a pair of output terminals, means for including voltage variations in said coil in response to rotation of said rotor to produce at said output terminals an undulating electrical signal whose amplitude and frequency are proportional to the rotational velocity of said rotor, a transistor amplifier circuit having emitter and base terminals and a collector, means electrically connecting one of said transistor circuit emitter and base terminals to one of said inductor coil output terminals, means electrically connecting the other of said transistor emitter and base terminals and the other of said inductor coil output terminals to a fixed reference voltage source, a trigger circuit, means electrically connecting the input of said trigger circuit to the output of said amplifier circuit to respond to the amplifier output signal for producing a signal of predetermined form, an electrically actuatable register operatively connected to the output of said trigger circuit to be actuated by signals produced by said trigger circuit, and gain control feedback means connected between said collector and said one terminal of said transistor amplifier circuit for (a) utilizing the full gain of said amplifier circuit to produce said amplifier output signal up to a predetermined frequency and (b) for decreasing said gain as said undulating signal increases above said predetermined frequency to avoid a possible voltage bias shift on said trigger circuit.

References Cited by the Examiner

UNITED STATES PATENTS

| | | | |
|---|---|---|---|
| 3,053,087 | 9/1962 | Waugh | 73—231 |
| 3,101,615 | 8/1963 | Pavone | 73—231 |
| 3,156,115 | 11/1964 | Adelmann | 73—198 |

FOREIGN PATENTS 791,655  3/1958  Great Britain.

OTHER REFERENCES

"High-speed Precision Tachometer" by W. R. Bland et al., Electronic Engineering, January 1954, pp. 2–8 relied upon.

RICHARD C. QUEISSER, *Primary Examiner.*

E. D. GILHOOLY, *Assistant Examiner.*